United States Patent [19]
Ferretti

[11] 3,831,347
[45] Aug. 27, 1974

[54] PROCESS FOR SCRUBBING A REACTION BY-PRODUCT VAPOR

[75] Inventor: Emmett J. Ferretti, Birmingham, Ala.

[73] Assignee: Diamond Shamrock Corporation, Cleveland, Ohio

[22] Filed: Feb. 5, 1973

[21] Appl. No.: 329,387

Related U.S. Application Data

[63] Continuation-in-part of Ser. No. 124,300, March 15, 1971, abandoned.

[52] U.S. Cl............................. 55/48, 55/71, 55/94
[51] Int. Cl............................................ B01d 53/14
[58] Field of Search......... 260/652 P, 654 S, 656 R, 260/660; 55/71, 89, 93, 94, 46, 48, 51

[56] References Cited
UNITED STATES PATENTS

| | | | |
|---|---|---|---|
| 2,271,866 | 2/1942 | Liston.................................. | 23/154 |
| 2,452,978 | 7/1946 | Allen et al........................... | 55/71 |
| 2,841,243 | 7/1958 | Hooker et al....................... | 260/654 |
| 3,304,337 | 2/1967 | Jordan et al........................ | 260/654 |

Primary Examiner—Charles N. Hart
Attorney, Agent, or Firm—John J. Freer

[57] ABSTRACT

In the reaction of hydrocarbons that may be solid at normal temperature and pressure, or yield products, by-products and/or intermediates that are solid under the same conditions, reaction by-product vapor further contains potential solids-forming material. The by-product vapor evolved from the reaction zone is solvent scrubbed, thereby eliminating plugging problem otherwise occurring downstream. In particular, chlorination reaction by-product vapor may be scrubbed and processed and the hydrogen chloride portion used for its hydrochlorination value. Such by-product can be continuously fed into a water-containing absorption zone from which muriatic acid may be obtained. Scrubber liquid can be in part recovered and recycled, e.g., to the reactor zone.

11 Claims, 7 Drawing Figures

INVENTOR
EMMETT J. FERRETTI

BY *John J. Freer*
ATTORNEY

PROCESS FOR SCRUBBING A REACTION BY-PRODUCT VAPOR

CROSS-REFERENCE TO RELATED APPLICATION

This application is a continuation-in-part application of Ser. No. 124,300 filed Mar. 15, 1971, and now abandoned.

BACKGROUND OF THE INVENTION

To achieve significant yields of hydrocarbons, some reactions are typically carried out in the vapor phase. For example U.S. Pat. No. 3,108,130 teaches a process for the vapor-phase chlorination of phthalodinitrile employing elevated temperature, a chlorination catalyst and chlorine gas. In liquid phase reactions, as for example a chlorination reaction such as where chlorine is typically bubbled into molten aromatic hydrocarbon, evolved hydrogen chloride and excess chlorine can also be present in reactor discharge gases. For example, U.S. Pat. No. 3,052,712 shows in part the chlorination of molten terephthaloyl dichloride where such conditions can be present.

These reaction by-product gases are evolved from the reaction zone, coming from such zone or from apparatus attendant with such zone, as for example desublimator apparatus or from cooling plus collecting apparatus, and as by-product vapor can then be free from the major portion of solids or solids-forming compounds formed in the reaction zone. The by-product will however contain solids-forming components that can lead to plugging problems in downstream purification equipment, for example from clogging due to gradual desublimation and eventual solids build-up of aromatic hydrocarbon swept out with the by-product vapor. To overcome this problem, it has heretofore been taught for example in U.S. Pat. No. 3,052,712 that a small amount of a solvent, such as carbon tetrachloride, can be introduced into the reactor preferably just prior to initiating the chlorination reaction, and such introduction of solvent may serve to prevent plugging of equipment by reaction products accumulating in by-product vapor condenser surfaces.

SUMMARY OF THE INVENTION

Processing of by-product vapor is now provided whereby the vapor is scrubbed, upon being derived from the reaction zone, with an organic solvent for removal of solids-forming substituents. Thereafter, in part, where the reaction is a chlorination the downstream processing may provide for a blending of scrubbed vapor with water and commensurate muriatic acid production, while yielding an absorber liquid that can be recycled to the scrubbing operation. Also in chlorinations, downstream processing may be operated to recover vapor rich in by-product halogen chloride for direct use, e.g., an in-plant hydrochlorination reaction, while also recovering scrubbing solvent for recycle. Process waste products constitute a significantly reduced pollution hazard; also, recovery of chlorinated hydrocarbon product, in the solids-forming substances in the by-product vapor, can be enhanced. Hence, the process affords the proven advantage of maintaining such downstream equipment free from plugging.

Accordingly, such advantages are accomplished by further processing which then, in part, can comprise: feeding by-product vapor evolved from an upstream chlorinator reactor zone into a scrubber zone containing water-immiscible liquid scrubbing solvent having a boiling point at atmospheric pressure of below about 150 C. thereby contacting the solvent with the vapor and removing solids-forming compounds therefrom; purging a portion of resulting blended scrubbing solvent containing solids-forming compounds from such scrubbing zone to the upstream chlorinator reactor zone wherein the solvent is flashed off; passing solvent-containing vapors overhead from the scrubber zone into a primary condenser zone, while permitting return of resulting condensate liquid effluent to the scrubber zone, thereby preparing a hydrogen chloride-rich and solvent-containing primary condenser discharge vapor having solids-forming compounds removed therefrom; discharging the solvent containing primary condenser discharge vapor from the primary condenser zone and passing same into a vent condenser zone, yielding a solvent-depleted tail gas and solvent containing liquid condensate; and withdrawing solvent-containing liquid condensate from the vent condenser zone and returning solvent-containing liquid to the scrubber zone.

In another aspect of the invention the by-product vapor is fed into the scrubber zone and only a liquid scrubber effluent and scrubber vapor are issued from the scrubber zone whereinafter the method continues by: discharging the solvent-containing scrubber vapor and feeding same to a secondary scrubbing zone containing additional scrubbing solvent for further removal of solids-forming compounds; passing solvent-containing liquid effluent from both scrubber zones into a solid collection zone, while permitting solids accumulation therein; discharging solvent-containing scrubber vapor, depleted of solids-forming compounds, from the secondary scrubber zone and passing same into a condenser zone, yielding a solvent-depleted condenser effluent vapor and solvent-containing liquid condensate; withdrawing solvent-containing liquid condensate from the condenser zone and feeding the condensate to a hold tank, a portion of the solvent-containing liquid from the hold tank being recycled for use as liquid scrubbing solvent, and a further portion being passed to the solids collection zone; and, discharging a solvent-containing slurry rich in solids-forming compounds from a solids collection zone to a separation zone, yielding therein a solids concentrate for removal and a solvent-containing separation zone effluent for recycle to one or more of the scrubber zones.

The invention in another aspect is directed to: feeding primary condenser discharge vapor depleted of solids-forming compounds, or such vapor as has also been mentioned above as having such compounds removed therefrom, into an absorption zone and contacting the vapor with water in such absorption zone. This aspect includes forming in the absorption zone a solvent-containing muriatic acid liquid phase and solvent-containing vapor phase; discharging the resulting liquid phase from such absorption zone to a separation zone and separating discharged liquid into a muriatic-acid-rich phase and a scrubber-solvent rich phase and withdrawing from the separation zone for eventual return, at least in part to the above-mentioned scrubber zone, the scrubber-solvent-rich phase. In a further aspect, solvent-containing vapors are discharged from such absorption zone overhead to the vent condenser zone discussed hereinbefore and liquid condensate is withdrawn from such vent condenser zone and fed to the aforesaid separation zone.

DESCRIPTION OF THE PREFERRED EMBODIMENTS

Figure 1:
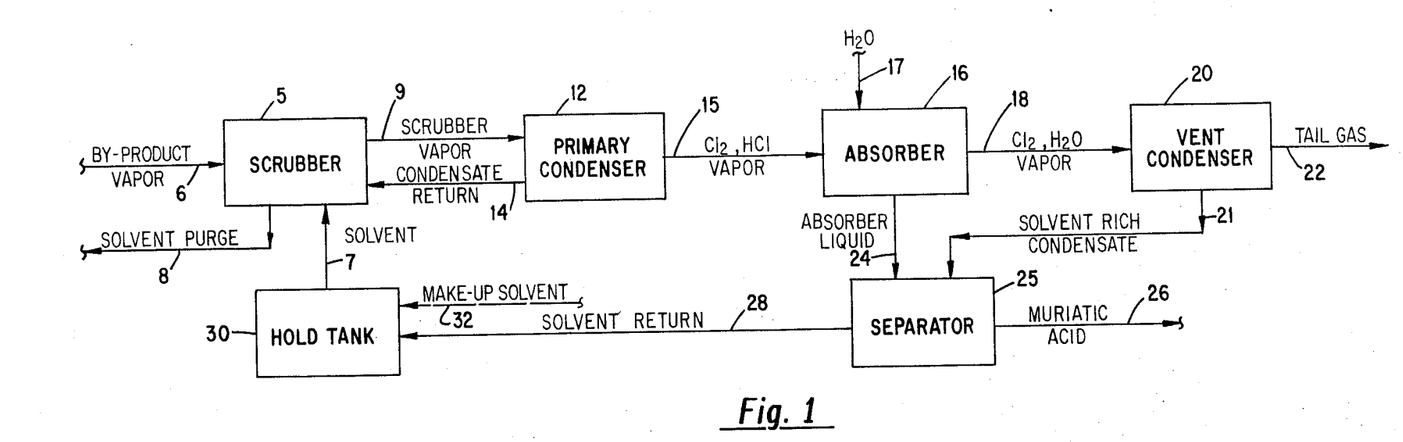
FIG. 1 shows diagrammatically a sequential process conducted in accordance with the present invention.

Referring to FIG. 1, hot by-product vapor feeding from a chlorinator reactor zone, not shown, enters the scrubber 5 through a by-product vapor inlet line 6. By use of the term "chlorinator reactor zone" herein is meant a zone containing one or more chlorinator reactors as well as any attendant equipment, if necessary. Thus, typically such zone may include desublimator apparatus or condenser apparatus or the like. Therefore when solvent is purged from the scrubber and fed upstream to the chlorinator reactor zone wherein the solvent is flashed off, such solvent may be thus fed directly into desublimator apparatus, or in to cooling and collecting apparatus, in such zone. Solvent feeding from a hold tank 30 through a solvent feed line 7 also enters the scrubber 5. Liquid effluent from the scrubber 5 is discharged through a solvent purge line 8 back upstream to the chlorinator reactor zone. Scrubbed vapors from the scrubber 5 are removed therefrom through an overhead vapor line 9 to a primary condenser 12 from which resulting condensate liquid effluent returns back to the scrubber 5 through a condensate return line 14.

From the primary condenser 12, hydrogen chloride-rich and solvent containing discharge vapor is passed through a discharge vapor line 15 into an absorber 16 to which water, feeding from a source not shown also enters from a water inlet line 17. Chlorine and solvent-containing vapor from the absorber 16 passes therefrom through a vapor discharge line 18 into a vent condenser 20 from which solvent-containing liquid effluent is drawn off through a condensate draw-off line 21 and fed to separator 25. Tail gas, being solvent-depleted, passes from the vent condenser 20 overhead through a tail gas discharge line 22.

From the absorber 16, solvent-containing muriatic acid liquid effluent is removed through a liquid draw-off line 24 to the separator 25. From the separator 25 a muriatic-acid-rich phase is drawn off through an acid discharge line 26 and a solvent-rich phase is removed from the separator 25 through a solvent return line 28 and fed to the hold tank 30. The hold tank 30 for the solvent can also be supplied with additional solvent feeding from a source not shown through a make-up solvent line 32. Solvent from the hold tank 30 can then be fed into the scrubber 5 through a solvent feed line 7.

Figure 2:
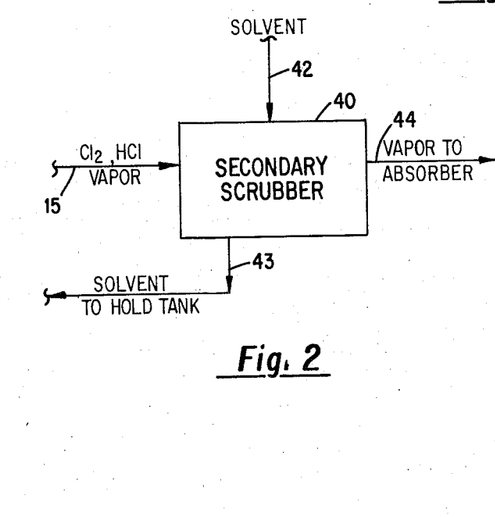
FIG. 2 is a diagrammatic illustration depicting alternate apparatus that may be introduced into a portion of the diagrammatic process of FIG. 1.

In FIG. 2, discharge vapor from the primary condenser 12 can be fed through the discharge vapor line 15 to a secondary scrubber 40 to which there is also fed solvent, from a source not shown, through a solvent feed inlet line 42. The liquid effluent from the secondary scrubber 40 is then removed through a solvent draw-off line 43 for return back to the scrubber 5. Vapor from the secondary scrubber 40 passes out through a vapor discharge line 44 and on to the absorber 16, or directly to the vent condenser 20.

Figure 3:
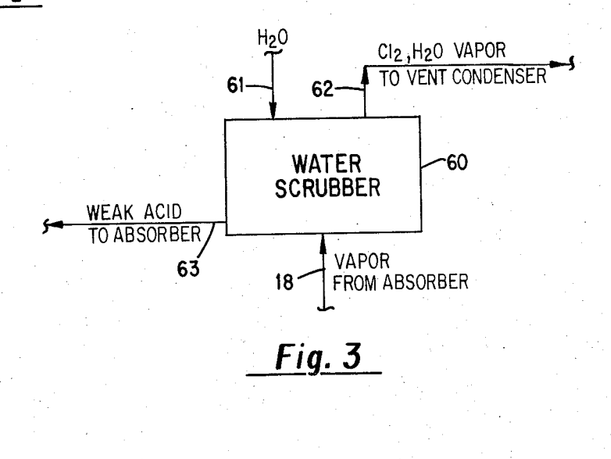
FIG. 3 is a further drawing showing diagrammatically apparatus that may be introduced into a portion of the process depicted in FIG. 1.

In FIG. 3 vapor from the absorber 16 passes through the vapor discharge line 18 into a water scrubber 60. Water entering from a source not shown is fed into the water scrubber 60 through a water inlet line 61 and water scrubbed vapor is discharged overhead from the water scrubber 60 through an overhead vapor line 62 for passage to the vent condenser 20. The weak acid forming in the water scrubber 60 is discharged through a liquid outlet line 63 back to the absorber 16. The water scrubber 60 can act in conjunction with the absorber 16 so that water furnished for the absorber 16 is provided completely through the water inlet line 61, that is, the absorber 16 is fed a weak muriatic acid for absorption from the water scrubber 60. Alternatively, weak acid from the scrubber 60 may be used in the absorber 16 along with fresh water entering through the water inlet line 17.

Figure 4:
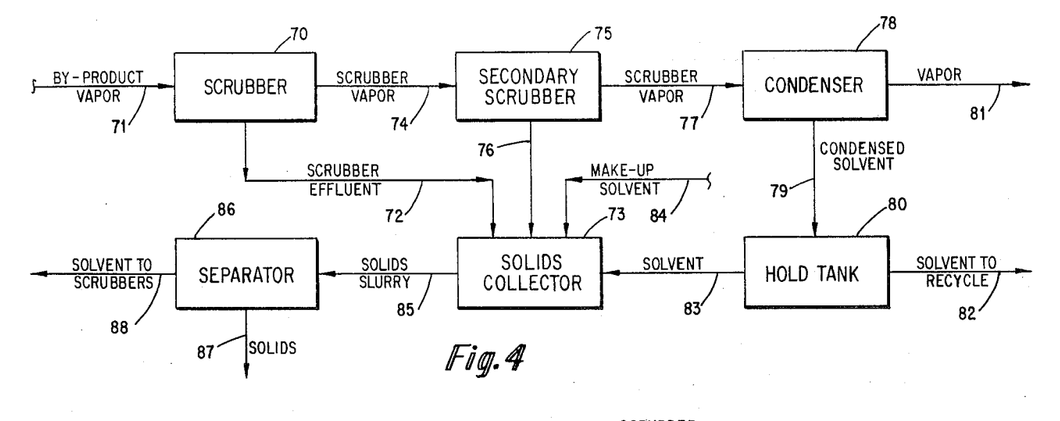
FIG. 4 shows diagrammatically another sequential process for conducting a method in accordance with the present invention.

Referring to FIG. 4, by-product vapor feeding from a reaction involving hydrocarbons, and which may be a chlorination reaction, enters the scrubber 70 through by-product vapor inlet line 71. Hereinagain, the reactor zone can include attendant equipment such as cooling and collecting apparatus as has been discussed hereinbefore. As will be discussed further hereinafter, scrubbing solvent, entering scrubber 70, through a line not shown, is present in the scrubber 70 for contacting the by-product vapor entering through the inlet line 71.

Liquid effluent from the scrubber 70 and containing solids-forming compounds that may be dissolved in the scrubber effluent, are discharged from the scrubber 70 through a scrubber effluent line 72 to a solids collector 73. Scrubbed vapors leaving the scrubber 70 are fed through an overhead vapor line 74 to a secondary scrubber 75. In the secondary scrubber 75 entering scrubber vapor is again contacted with scrubbing solvent, entering through a line not shown. Liquid effluent from the secondary scrubber 75 is discharged through a secondary scrubber effluent line 76 to the solids-collector 73. The scrubbed vapors from the secondary scrubber 75 exit through a scrubbed vapor line 77 to a condenser 78. From the condenser 78, resulting condensing liquid effluent is discharged through a condensed solvent line 79 to hold tank 80. Vapor exits from condenser 78 through a vapor exit line 81.

From the hold tank 80 a portion of the solvent entering therein from the condensed solvent line 79 can be recycled through the solvent recycle line 82 for feeding through lines not shown into the scrubber 70 or the secondary scrubber 75. Also, a portion of the solvent in the hold tank 80 can be fed through a solvent discharge line 83 into the solids collector 73. Additional solvent for this system can be fed into the solids collector 73 through a make-up solvent line 84.

A solids-laden slurry is removed from the solids collector 73 through a solids slurry line 85 and enters a separator 86 from which solids are removed through a solids removal line 87. Solvent from the separator 86 is fed from a solvent discharge line 88 and enters, as mentioned hereinabove, through lines not shown, to the scrubber 70 or the secondary scrubber 75 or both.

Figure 5:
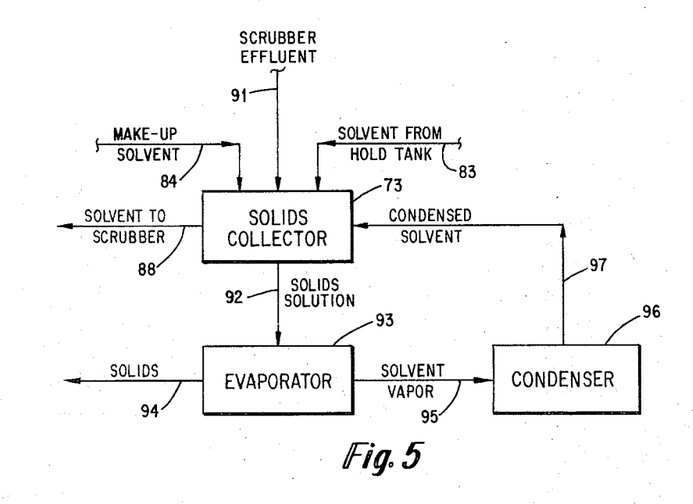
FIG. 5 is a schematic diagram depicting alternate apparatus that can be introduced into a portion of the process diagrammed in FIG. 4.
Figure 6:
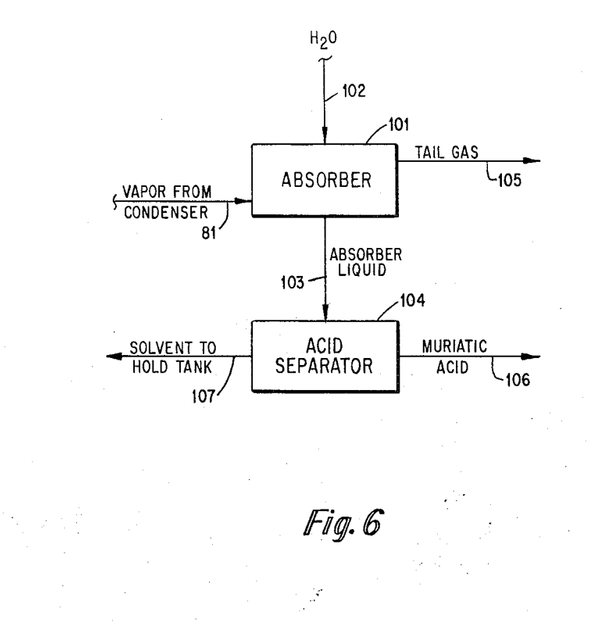
FIG. 6 shows diagrammatically apparatus that may be introduced downstream from the condenser depicted in FIG. 4.

In FIG. 5, scrubber effluent from the scrubber 70 or the secondary scrubber 75, or both, enters the solids collector 73 through the scrubber effluent line 90. Additional scrubbing solvent further comes into the solids collector 73 as solvent from the hold tank, through the solvent discharge line 83, and as make-up solvent for the system through the make-up solvent line 84. Solvent from the solids collector 73 is then discharged to the scrubbers through the solvent discharge line 88. Also from the solids collector 73, a solids solution exits through a solids solution discharge line 92 to an evaporator 93. In the evaporator 93, solids are removed through a solids exit line 94 and solvent vapor passes from the evaporator 93 through a solvent vapor exit line 95 into a condenser 96. From the condenser 96, condensed solvent is removed through a solvent effluent line 97 and returned to the solids collector 73.

Where the initial reaction has been a chlorination, and referring to FIG. 6, vapor containing hydrogen chloride and exiting from the condenser through the vapor exit line 81 is fed through such line into an absorber 101. In the absorber 101 water feeding from a source not shown feeds through the water inlet line 102 for contact with the vapor present therein. From the absorber 101, the solvent-containing muriatic acid liquid effluent is removed through a liquid draw-off line 103 and passed to the acid separator 104. Tail gas, being solvent-depleted as well as hydrogen chloride-depleted passes from the absorber 101 through a tail gas discharge line 105. In the acid sseparator 104, a muriatic-acid-rich phase is drawn off through an acid discharge line 106 and a solvent-rich phase is removed from the separator 104 through a solvent return line 107 and fed to the hold tank 80.

Figure 7:
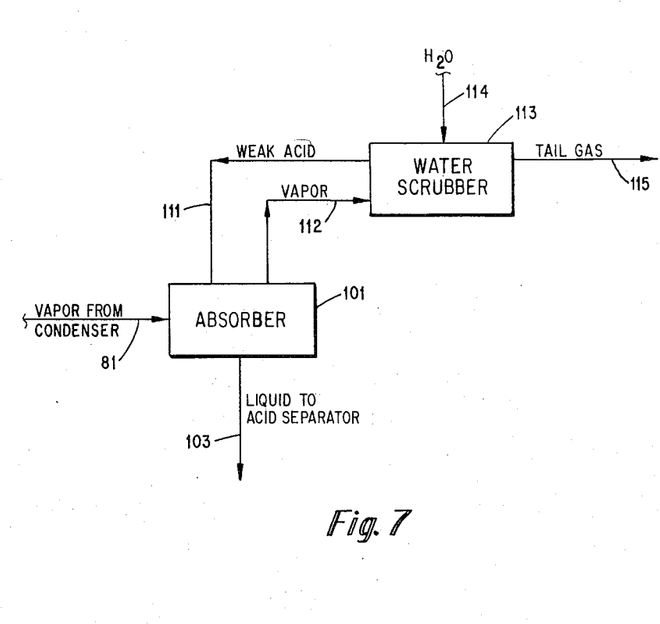
FIG. 7 is a further drawing showing alternate apparatus that may be introduced as a replacement for the apparatus of FIG. 6.

In FIG. 7 vapor from the condenser enters the absorber 101 through the vapor exit line 81 and is contacted therein with weak acid entering through a weak acid line 111. From the absorber 101, absorber liquid is drawn off through a liquid draw-off line 103 for passage into the acid separator 104. Vapor exiting from the absorber 101 through a vapor exit line 112 is passed into a water scrubber 113. In the water scrubber 113, water, feeding from a source not shown, enters through a water inlet line 114. The resulting weak acid formed in the water scrubber 113 is drawn off through the weak acid line 111 and returned to the absorber 101. Tail gas leaves the water scrubber 113 through a scrubber exit line 115.

The scrubber 5 and primary condenser 12 can be represented in the system by a single column with scrubbing solvent entering the upper zone of the column. The scrubbing solvent moving downwardly from the upper zone of the column, along with accumulating column condensate moving along with such solvent, is collected at the bottom zone of the column. Thus the upper column area serves as a condensing zone with the column portion located downwardly therefrom serving as a scrubbing zone. Collecting condensate and scrubbing solvent can be drawn off from the bottom of the column and passed to the hold tank 30. Vapor discharging overhead from the column is then passed on to the absorber 16, or to the vent condenser 20.

When hydrogen chloride vapor is desired, for example for an in-plant use where the vapor can be used directly for its hydrochlorination value, the absorber 16 can be by-passed, and primary condenser discharge vapor passing through the vapor line 15 can be fed directly to the vent condenser 20. The resulting tail-gas, rich in hydrogen chloride and being solvent-depleted, can then be dried and processed by conventional methods well known in the art for yeilding a hydrogen chloride vapor for subsequent direct use. Otherwise, that is when muriatic acid is desired and an absorber forms a portion of the process, the absorber 16 can be an adiabatic absorption column with water feeding into the upper zone of the column and muriatic acid collecting at the bottom of the column for removal, e.g., to the separator 25.

Overhead from the adiabatic absorption column, the solvent-containing vapor is then passed to the vent condenser 20, and optionally through compression and additional condensing apparatus, with resulting additional condensate passing to the separator. From the separator, a solvent-rich phase and an acid-rich phase may be removed.

Solvent-rich condensate from the vent condenser 20, or water-containing additional condensate from additional condensing apparatus downstream from an adiabatic absorption column, may be recycled back to the absorber or back to a water scrubber downstream from an absorber as shown in FIG. 3. Tail gas, that may contain in part nitrogen and carbon dioxide, can be processed, for example by drying, and then subsequently recycled back to the chlorinator reactor zone, or simply neutralized and discharged. Make-up solvent may be introduced at various points of the system, for example into separation apparatus downstream from an adiabatic absorber or into separator 25 of FIG. 1 or into a hold tank 30. Solvent purged from the hold tank 30 or from the scrubber 5 through a solvent purge line is fed back to the chlorinator reactor zone under conditions for vaporizing purged solvent feeding into said reactor zone. The condensate return line 14 may also be split to expedite passing condensate return through a line not shown to the solvent purge line 8, or to the hold tank 30, without direct return to the scrubber 5.

Liquid scrubber effluent from the scrubber 5 may be fed to the hold tank 30 through a scrubber draw-off line, not shown. From the hold tank 30 solvent may be removed for feeding to the upstream chlorinator reactor zone through a hold tank solvent purge line, not shown, acting alternatively from, or in conjunction with, the solvent purge line 8 from the scrubber 5. Also, solvent returning to the hold tank 30 through the return line 28 may be first dried, by means not shown, prior to entering the hold tank 30.

Although the scrubber 5 may serve to continuously and effectively remove solids-forming substances from downstream purification equipment as, for example, with chlorination of terephthaloyl dichloride wherein such a scrubber has afforded extended, continuous solids removal, if such removal is not effective, e.g., for a desirably extended time, a secondary scrubber may be employed, as has been discussed hereinbefore. Such a secondary scrubber may be used continuously, or reserved for temporary operation in an overloaded situation. Referring again to FIG. 2, discharge vapor from the primary condenser 12 can be fed through the discharge vapor line 15 to a secondary scrubber 40 to which there is also fed scrubbing solvent through the scrubber inlet line 42. The liquid effluent containing solids-forming compounds is then removed through the scrubber drawoff line 43 and fed to a clarification zone, not shown. In the clarification zone, scrubbing solvent is obtained that may then be, in part, returned to the secondary scrubber 40 through the scrubber inlet line 42. Solids from the clarification zone can be discharged therefrom for subsequent solids recovery. Vapor from the secondary scrubber 40 passes out through a vapor discharge line 44 and can pass on to the absorber 16, or may be fed directly into the vent condenser 20. Alternatively, vapor in the vapor discharge line 44, or from the discharge vapor line 15, may be first treated for chlorine recovery, such as disclosed in U.S. Pat. No. 2,765,873, prior to passing such vapor to the absorber 16.

Where the initial hydrocarbon reaction involves, for example, a chlorination reaction, where vapors exiting the condenser 78 contain both chlorine and hydrogen chloride for recovery, chlorine recovery can be practiced first. For this, prior to apparatus disclosed in FIG. 6 or FIG. 7, the vapor exiting the condenser 78 through the vapor exit line 81 may be processed for chlorine recovery such as with techniques disclosed in U.S. Pat. No. 2,765,873. Such chlorine recovery may be practiced on the vapor leaving condenser 78 even when such vapor does not contain hydrogen chloride. If desired, the solvent recycling from the separator 86 in FIG. 4 may be passed through heat exchangers in the solvent discharge line 88 prior to recycling solvent to the scrubber system. Also, in FIG. 6 the solvent discharged from the acid separator 104 for return to the hold tank 80 may be dried prior to feeding to the hold tank 80. The separator 86 in FIG. 4 is preferably a filtration separator for removing solids from the system. The solids thus removed may be returned to the hydrocarbon reaction zone, depending in part upon the reaction involved, or for subsequent processing and/or use. In addition to adding make-up solvent to the solids collector 73, solvent may be introduced at various points of the system, for example to the hold tank 80 or separator 86 or directly into the scrubber 70 or secondary scrubber 75. Also, where the reactor zone includes attendant cooling apparatus, scrubbing solvent may be used in such cooling apparatus and scrubbing solvent vapor may then form a portion of the by-product vapor that enters the scrubber 70 through the vapor inlet line 71.

The chlorination carried out on the hydrocarbon can be with an aromatic hydrocarbon and involve ring chlorination or side chain chlorination or both and may proceed at atmospheric, subatmospheric, or superatmospheric pressure. Also, with some aliphatic hydrocarbons, e.g., ethylene, chlorination reaction may produce chlorinated aromatic hydrocarbons in the reaction products that are potential solids-forming substituents, and thus such aliphatic hydrocarbon chlorinations are also susceptable to the processing improvements of the present invention. All such reactions typically proceed at elevated temperature to enhance completion of the reaction. Preferably, the scrubbing solvent employed is substantially inert to chlorination during vaporization in the upstream chlorinator reactor zone, for example is inert to chlorination at an elevated temperature of 200°–300° C. during such vaporization. For some suitable solvents, e.g., carbon tetrachloride, chlorination is not a consideration. However, such substance and other scrubbing solvents can or have been used, and including benzene, xylol, chloroform, ehtylene dichloride, toluene, trichloroethylene, methylene chloride, 1,1,1-trichlorethane, perchlorethylene, and the like, are preferably water immiscible solvents to enhance separation of the solvent from muriatic acid and/or water-containing condensate liquid. Also such solvents are preferably substances having a boiling point at atmospheric pressure below about 150° C. for enhanced vaporization of purged solvent recycled to the upstream chlorinator reactor zone.

Referring again to FIG. 1, gas feeding from a chlorinator reactor zone and containing, by weight, 294 parts of gaseous chlorine, 414 parts of hydrogen chloride, 2,300 parts of carbon tetrachloride and 2 parts of solid-forming tetrachloroisophthalonitrile vapor, all at atmospheric pressure and a temperature of about 190° F., are fed through the by-product vapor inlet line 6 into the scrubber 5. On a basis of each 2,300 parts of carbon tetrachloride entering through the by-product vapor inlet line 6, an additional 814 parts of carbon tetrachloride are fed to the scrubber 5 through the solvent feed line 7. Scrubbed vapor from the scrubber 5 passes through the overhead vapor line 9 to the condenser 12 from which liquid condensate effluent is returned to the scrubber 5 through the condensate return line 14.

From the scrubber 5, 2,300 parts of carbon tetrachloride liquid at about 100° F., per 2,300 parts of carbon tetrachloride feeding into the scrubber 5 from the by-product vapor inlet line 6, are withdrawn through the solvent purge line 8. This purge further contains 90 parts of chlorine, 5 parts of hydrogen chloride and about 2 parts of the above mentioned solid-forming substance. This purge is fed by the solvent purge line 8 back upstream to the chlorinator reactor zone, wherein the carbon tetrachloride may be present, for example, in an amount of between about 5–95 weight percent, and more typically about 25–75 weight percent, basis weight of chlorinated reaction product, and wherein the carbon tetrachloride in the zone is vaporized and returned to the scrubber 5 through the by-product vapor inlet line 6.

Vapor overhead from the condenser 12, and containing 204 parts of chlorine, 414 parts of hydrogen chloride and 814 parts of carbon tetrachloride, and all at a temperature of about 100°–105° F., is passed on to the absorber 16. The make-up of this overhead vapor can be in large part dependent upon the stoichiometric amount or excess of chlorine needed or used in the chlorination reaction zone. For example, although desirable operation for ring chlorination of isophthalonitrile leads herein to a weight ratio of hydrogen chloride vapor to chlorine of about 2:1, typical efficient ring chlorination of terephthaloyl dichloride can provide for a weight ratio of about 9:1 of hydrogen chloride vapor to chlorine in the overhead vapor from the condenser 12. Also into the absorber 16 there is fed 885.5 parts of water per 414 parts of hydrogen chloride coming from the condenser 12. The water enters through the water inlet line 17 at ambient temperature and atmospheric pressure. From the liquid draw-off line 24 there is discharged from the absorber 16 a solution of 421 parts of hydrogen chloride in 880.5 parts water; this solution is a liquid at about 170°–180° F. and further contains 1.2 part of chlorine and 660 parts of carbon tetrachloride all of which are fed to the separator 25.

From the separator 25 a carbon tetrachloride-rich phase is withdrawn for storage in the hold tank 30 and subsequent re-use through the solvent return line 28. Also from the separator 25, a muriatic acid-rich phase is withdrawn through the acid discharge line 26 and fed to a stripper, not shown. From the stripper there is discharged about 414 parts of hydrogen chloride in about 880 parts of water, this weak acid additionally containing about 10 parts per million of chlorine. This acid, at a temperature of about 100° F. is passed to storage. Vapor from the stripper and containing about 0.5 part water, 1.2 part of chlorine and 7 parts of hydrogen chloride, is recycled back into the condenser discharge vapor line 15, by a vapor feed line, not shown.

Overhead from the absorber 16, vapor at a temperature of about 100° F. is passed through the vapor discharge line 18. Such vapor is made up from about 5 parts water, 204 parts chlorine and 154 parts of carbon tetrachloride; this vapor is first compressed, by means not shown, to about 45 psig, and then subsequently condensed in the condenser 20 to remove 4.1 parts water and 125 parts carbon tetrachloride. This condensate is discharged through the condensate draw-off line 21 and passed to the separator 25. The tail gas discharging through the tail gas discharge line 22 from the condenser 20, and at a temperature of about 100° F. and a pressure of 45 psig, contains about 0.9 part water, 204 parts chlorine and 29 parts carbon tetrachloride. This vapor can be dried and recovered.

By this operation, about 96.5 weight percent of the carbon tetrachloride scrubbing solvent is recovered for subsequent recycle. Additionally, virtually all of the hydrogen chloride from the chlorinator reactor zone is recovered as muriatic acid. After stripping, the acid can be polish filtered and is thereby ready for commercial use. Moreover, solids-forming tetrachloroisophthalonitrile is advantageously retained upstream from the absorption and separation portions of the system, thus permitting extended continuous operation over many months duration, free from equipment pluggage due to solids formation and accumulation on equipment surfaces.

Referring again to FIG. 4, gas feeding from a chlorinator reactor zone and containing, by wieght, 5 parts of nitrogen, about 12.1 parts of hydrogen chloride, about 11.9 parts of gaseous chlorine, 42.6 parts of carbon tetrachloride, and about 1.1 parts of solid-forming chlorinated aromatics, all at atmospheric pressure and at a temperature of about 350° F. are fed through the by-product vapor inlet line 71 into the scrubber 70. Carbon tetrachloride in the by-product vapor enters upstream of the scrubber 70 for cooling reactor gases in apparatus that is attendant to the reaction zone. On the basis of each 42.6 parts of carbon tetrachloride entering through the by-product vapor inlet line 71, which basis will be used hereinafter and referred to simply as the "basis," an additional 1,290 parts of carbon tetrachloride, also containing for example hydrogen chloride as will be detailed further hereinbelow, are fed to the scrubber 70 at a temperature of 140° F. and as recycle from the solvent discharge line 88 from the separator 86. Scrubber vapor leaving the scrubber 70 is fed through the overhead vapor line 74 to the secondary scrubber 75 wherein an additional 1,290 parts of such carbon tetrachloride as just discussed are fed from the solvent discharge line 88.

The combined scrubber effluent entering the solids collector 73 through the scrubber effluent line 72 and secondary scrubber effluent line 76, is all at a temperature of 59° C. and atmospheric pressure. This combined scrubber effluent contains, on the above-described basis, the about 1.1 parts of chlorinated aromatics, and about 2,932 parts of carbon tetrachloride, as well as 8.4 parts of $Cl_2$ and 2.6 parts hydrogen chloride.

From the solids collector 73 a solid slurry is passed to the separator 86 through the solids slurry line 85. From the separator 86, on the above-mentioned basis, there is removed about 1.1 parts of aromatics through the solids removal line 87, and 2,580 parts of scrubber solvent containing 2.8 parts hydrogen chloride and 9.8 parts chlorine is fed through the solvent discharge line 88 for recycle to the scrubber 70 and secondary scrubber 75. Scrubber vapor, at a temperature of 59° C. and at a pressure of atmospheric, and again on the same basis, that is passing through the scrubber vapor line 77, contains 5 parts of nitrogen, about 12.6 parts of hydrogen chloride, 14.5 parts of gaseous chlorine, and 140 parts of carbon tetrachloride. This vapor enters the condenser 78, and exiting from there through the vapor exit line 81, and all at a temperature of −12° C., are 5 parts of nitrogen, about 11.8 parts of hydrogen chloride, 10.5 parts of chlorine, and 3.4 parts of carbon tetrachloride. Also exiting the condenser 78, and flowing through the condensed solvent line 79 into the hold tank 80, about 0.9 part hydrogen chloride, 4 parts chlorine, and 136.6 parts of carbon tetrachloride. From the hold tank 80 there is fed for recycle, to the scrubbers and through the solvent recycle line 82, 42.6 parts carbon tetrachloride, 1.2 parts chlorine and 0.3 part hydrogen chloride. To the solids collector 73 there is passed from the hold tank 80 through the solvent discharge line 83, 94 parts carbon tetrachloride, 2.8 parts chlorine and 0.6 part hydrogen chloride.

I claim:

1. In a method for processing a hydrogen chloride by-product vapor containing entrained solids-forming compounds, wherein said by-product vapor evolves from chlorinating in a chlorinator reactor a hydrocarbon that may be solid at normal temperature and pressure, or yield chlorination reaction products or by-products that are solids under the same conditions, the improvement in processing which then comprises:

1. passing by-product vapor, feeding from an upstream chlorinator reactor zone, into a scrubber zone containing water-immiscible liquid scrubbing solvent having a boiling point at atmospheric pressure of below about 150° C., thereby contacting said solvent with said vapor and removing solids-forming compounds therefrom;

2. withdrawing a portion of resulting blended scrubbing solvent containing solids-forming compounds, from said scrubber zone, and passing said withdrawn scrubbing solvent to said upstream chlorinator reactor zone wherein the solvent is flashed off;

3. removing solvent-containing vapors overhead from said scrubber zone and passing said solvent-containing vapors into a primary condenser zone, returning the resulting condensate liquid effluent from said primary condenser zone to said scrubber zone, thereby preparing a hydrogen chloride-rich and solvent-containing primary condenser discharge vapor, said vapor having solids-forming compounds removed therefrom;

4. removing said hydrogen chloride-rich and solvent-containing primary condenser discharge vapor from said primary condenser zone and passing same into a vent condenser zone, yielding a solvent-depleted tail gas and solvent-containing liquid condensate; and 5. withdrawing solvent containing liquid condensate from said vent condenser zone and returning solvent-containing liquid for said step (1) scrubber zone.

2. The process of claim 1 further characterized in the removal in step (4) of hydrogen chloride-rich and solvent-containing primary condenser vapor and subsequent passage of same to the vent condenser zone by:

A. first passing said hydrogen chloride-rich and solvent-containing vapor into an absorption zone and contacting said vapor with water in said absorption zone, forming therein a solvent-containing muriatic acid liquid phase and solvent-containing vapor phase;

B. withdrawing the resulting solvent-containing muriatic acid liquid phase from said absorption zone and passing such withdrawn liquid phase to a separation zone, therein separating the withdrawn liquid phase into a muriatic-acid-rich phase for removal and a scrubber-solvent rich, solvent-containing phase;

C. withdrawing the scrubber-solvent rich, solvent-containing phase from the separation zone and recycling same to the scrubber zone of step (1);

D. removing the solvent-containing vapor phase from the step (A) absorption zone and passing same overhead to said step (4) vent condenser zone; and, E. passing the withdrawn solvent-containing liquid condensate from said step (5) condenser zone and feeding same to said step (B) separation zone.

3. The process of claim 1 wherein the feeding of hydrogen chloride-rich and solvent-containing primary condenser vapor in steps (3) and (4) from an absorption zone, is further characterized by:

R. first passing said hydrogen chloride-rich and solvent-containing vapor into an absorption zone and contacting said vapor in said zone with weak muriatic acid, forming therein a solvent-containing enriched muriatic acid liquid phase and solvent-containing vapor;

S. passing said solvent-containing vapor to a water scrubbing zone and contacting the solvent-containing vapor with water in the water scrubbing zne, thereby preparing a weak muriatic acid liquid phase and a solvent-containing vapor;

T. recycling said weak muriatic acid liquid phase to said absorption zone of step (R);

U. withdrawing the solvent-containing vapor from the step (S) water scrubbing zone and passing said vapor to said step (4) vent condenser zone;

V. removing said enriched muriatic acid liquid phase from said step (R) absorption zone and feeding same to a separation zone, therein separating the withdrawn liquid phase into a muriatic-acid-rich phase for removal and a scrubber-solvent rich, solvent-containing phase;

W. Withdrawing the scrubber-solvent rich, solvent-containing phase from the separation zone and recycling same to te scrubber zone of step (1); and, X. passing the withdrawn solvent-containing liquid condensate from said step (5) condenser zone and feeding same to said step (V) separation zone.

4. The process of claim 1 further characterized in that the hydrogen chloride-rich and solvent-containing primary condenser vapor from step (3) contains solids-forming compounds, wherein this primary condenser vapor that would be subsequently passed to the vent condenser zone is first preceded by:

X. scrubbing such primary condenser vapor with additional of said step (1) water-immiscible liquid scrubbing solvent in a secondary scrubber zone forming therein a secondary scrubbing zone liquid and a secondary scrubbing zone vapor;

Y. withdrawing the secondary scrubber zone liquid and returning same to said step (1) scrubber zone; and, Z. removing said secondary scrubber zone vapor and feeding same to said step (4) vent condenser zone.

5. In a method for processing a reaction by-product vapor containing entrained solids-forming compounds, wherein said by-product vapor evolves from reacting a hydrocarbon that may be solid at normal temperature and pressure, or yield reaction products or by-products that are solids under the same conditions, the improvement in processing which then comprises:

1. passing said by-product vapor evolved from an upstream reactor zone into an initial scrubber zone, containing water-immiscible liquid scrubbing solvent having solvent activity with respect to said entrained solids-forming compounds and having a boiling point at atmospheric pressure of below about 150° C., thereby contacting said solvent with said vapor and removing solids-forming compounds therefrom;

2. removing solvent-containing scrubbed vapor from the initial scrubbing zone and feeding same to a secondary scrubbing zone containing additional of said scrubbing solvent for further removal of solids-forming compounds;

3. withdrawing solvent-containing liquid effluent from both scrubber zones and passing the withdrawn liquid effluent into a solids collection zone, while permitting solids accumulation therein;

4. discharging solvent-containing scrubber vapor, depleted of solids-forming compounds, from said secondary scrubber zone and passing same into a condenser zone, yielding a solvent-depleted condenser effluent vapor and solvent-containing liquid condensate;

5. withdrawing said solvent-containing liquid from said condenser zone and feeding the condensate to a hold tank, a portion of the solvent-containing liquid from the hold tank being recycled for use as liquid scrubbing solvent, and a further portion of such liquid from the hold tank being removed therefrom and passed to said solids collection zone; and 6. withdrawing a solvent-containing slurry rich in solids-forming compounds from said solids collection zone and feeding same to a separation zone, yielding therein a solids concentrate for removal and a solvent-containing separation zone effluent to recycle for use as liquid scrubbing solvent.

6. The process of claim 5 further characterized in the withdrawing from step (6) of the solvent-containing slurry from said solids collection zone, by;
A. passing such solvent-containing slurry into an evaporator separation zone, yielding therein an evaporated solids concentrate and solvent-containing vapor effluent;
B. removing the resulting solvent-containing vapor effluent, condensing same, and recycling the condensed solvent to said step (3) solids collection zone; and
C. withdrawing from the evaporator separation zone said evaporated solids concentrate.

7. In a method for processing a hydrogen chlroide by-product vapor containing entrained solids-forming compounds, wherein said by-product vapor evolves from chlorinating in a chlorinator reactor a hydrocarbon that may be solid at normal temperature and pressure, or yield chlorination reaction products or by-products that are solids under the same conditions, the improvement in processing which then comprises:
1. passing said by-product vapor, evolved from an upstream chlorinator reactor zone, into an initial scrubber zone, containing water-immiscible liquid scrubbing solvent having solvent activity with respect to said entrained solids-forming compounds and having a boiling point at atmospheric pressure of below about 150° C., thereby contacting said solvent with said vapor and removing solids-forming compounds therefrom;
2. removing solvent-containing scrubbing vapor from the initial scrubbing zone and feeding same to a secondary scrubbing zone containing additional of said scrubbing solvent for further removal of solids-forming compounds;
3. withdrawing solvent-containing liquid effluent from both scrubber zones and passing the withdrawn liquid effluent into a solids collection zone, while permitting solids accumulation therein;
4. discharging solvent-containing scrubber vapor, depleted of solids-forming compounds, from said secondary scrubber zone and passing same into a condenser zone, yielding a solvent-depleted, hydrogen-chloride-containing condenser effluent vapor as well as a solvent-containing liquid condensate;
5. withdrawing said solvent-containing liquid condensate from said condenser zone and feeding this withdrawn liquid condensate to a hold tank, a portion of the solvent-containing liquid from the hold tnak being recycled for use as liquid scrubbing solvent, and a further portion of such liquid from the hold tank being removed therefrom and passed to said solids collection zone; and
6. removing a solvent-containing slurry rich in solids-forming compounds from said solids collection zone and feeding same to a separation zone, yielding therein a solids concentrate for removal and a solvent-containing separation zone effluent to recycle for use as liquid scrubbing solvent.

8. The process of claim 7 further characterized in the removing from step (6) of the solvent-containing slurry from said solids collection zone, by;
A. passing such solvent-containing slurry into an evaporator separation zone, yielding therein an evapoarted solids concentrate and solvent-containing vapor effluent;
B. removing the resulting solvent-containing vapor effluent, condensing same, and recycling the condensed solvent to said step (3) solids collection zone; and
C. withdrawing from the evaporator separation zone said evaporated solids concentrate.

9. The process of claim 7 further characterized in that the solvent-depleted, hydrogen-chloride-containing condenser effluent vapor in step (4) is discharged therefrom for further processing initiated by:

X. first passing said solvent-depleted, hydrogen-chloride-containing condenser effluent vapor into an absorption zone and contacting said vapor with water in said absorption zone, forming therein a solvent-containing muriatic acid liquid phase and tail gas vapor phase;
Y. withdrawing the resulting solvent-containing muriatic acid liquid phase from said absorption zone and passing same to an acid separation zone, separating liquid therein into a muriatic-acid-rich phase for removal and a scrubber-solvent rich, solvent-containing liquid phase; and,
Z. withdrawing from the acid separation zone and returning to the hold tank of step (5) said scrubber-solvent rich, solvent-containing liquid.

10. The process of claim 7 wherein the solvent-depleted, hydrogen-chloride-containing condenser effluent vapor yielded in step (4) is further processed by:

R. passing solvent-depleted, hydrogen-chloride-containing condenser effluent vapor into an absorption zone and contacting said vapor with weak muriatic acid in said absorption zone, forming therein a solvent-containing enriched muriatic acid liquid phase and solvent-containing vapor;
S. withdrawing said solvent-containing vapor, passing same to a water scrubbing zone and contacting said solvent-containing vapor therein with water, thereby preparing a weak muriatic acid liquid phase and a tail gas vapor;
T. removing said weak muriatic acid liquid phase and recycling said phase to said absorption zone of step (R);
U. discharging said solvent-containing enriched muriatic acid liquid phase from said step (R) absorption zone and feeding same to an acid separation zone, separating liquid therein into a muriatic-acid-rich phase for removal and a scrubber-solvent rich, solvent-containing liquid phase; and,
V. withdrawing from the acid separation zone and returning to the hold tank of step (5) said scrubber-solvent-rich, solvent-containing liquid.

11. The process of claim 7 further characterized in that vapor from the chlorinator reactor zone is cooled by contacting with scrubber solvent in a contact zone, and said by-product vapor is evolved from said reactor zone after contact, whereby the vapor feeding to said initial scrubber zone of step (1) is a solvent-containing vapor.

* * * * *